United States Patent [19]
Ginsburgh et al.

[11] Patent Number: 4,735,501
[45] Date of Patent: Apr. 5, 1988

[54] METHOD AND APPARATUS FOR FLUID PROPELLED BORESCOPES

[75] Inventors: Irwin Ginsburgh, Newhall; John A. Carlson, III, Burbank; Geoffrey L. Taylor, Valencia; Hamid Saghatchi, Burbank, all of Calif.

[73] Assignee: Identechs Corporation, Costa Mesa, Calif.

[21] Appl. No.: 854,295

[22] Filed: Apr. 21, 1986

[51] Int. Cl.$^4$ ............................................. G01N 21/88
[52] U.S. Cl. .................... 356/241; 350/96.26
[58] Field of Search ............. 356/241; 350/573, 96.25, 350/96.26; 128/4, 5, 6, 7, 8; 60/221; 114/334, 337; 358/99

[56] References Cited
U.S. PATENT DOCUMENTS

| | | | |
|---|---|---|---|
| 2,461,797 | 2/1949 | Zwicky | 60/221 X |
| 2,963,543 | 12/1960 | Liuk et al. | 114/337 X |
| 3,354,658 | 11/1967 | Leonardi | 114/334 X |
| 3,550,386 | 12/1970 | Ballinger | 114/337 X |
| 3,694,094 | 9/1972 | Low et al. | 356/241 |
| 4,042,823 | 8/1977 | Decker et al. | 350/96.26 X |
| 4,509,507 | 4/1985 | Yabe | 128/4 |

FOREIGN PATENT DOCUMENTS

| | | | |
|---|---|---|---|
| 189604 | 11/1983 | Japan | 350/96.26 |
| 1296534 | 11/1972 | United Kingdom | 356/241 |

*Primary Examiner*—Davis L. Willis
*Assistant Examiner*—Matthew W. Koren
*Attorney, Agent, or Firm*—William L. Chapin

[57] ABSTRACT

A method and apparatus for propelling a borescope being used to inspect inaccessible areas comprises one or more reaction jets attached to the borescope, the reaction jets expelling gas, liquid or other fluids to produce a reaction thrust force on the borescope. In one embodiment, a reaction jet is fastened to the remote head of an articulateable borescope, and the propulsion direction is controlled by an operator who views a desired aim point at the output end of the borescope cable, and articulates the borescope head to point at the desired aim point. In another embodiment, the orientation of the thrust vector of the reaction jets is controllable, permitting an operator to control the direction of travel of a borescope not necessarily possessing an independent articulation capability.

57 Claims, 4 Drawing Sheets

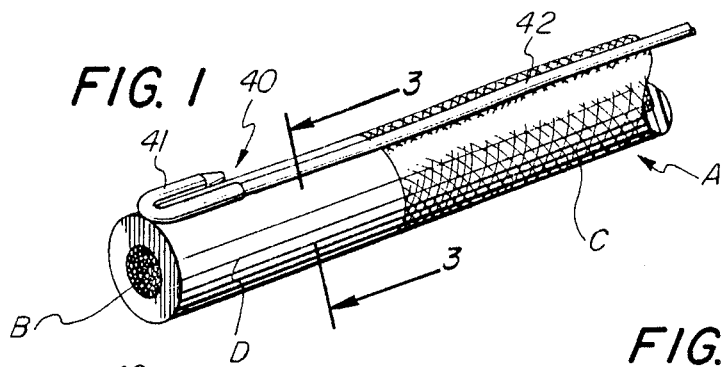
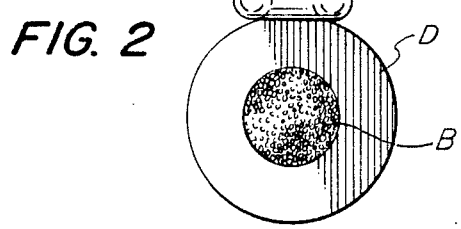
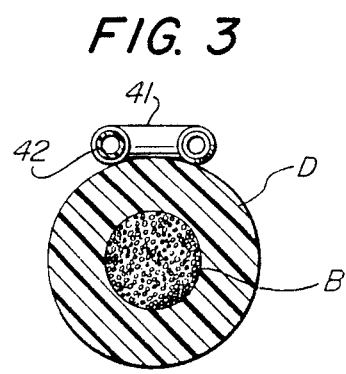
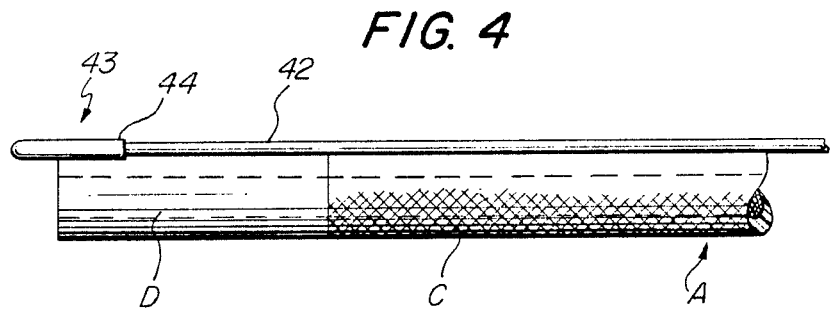
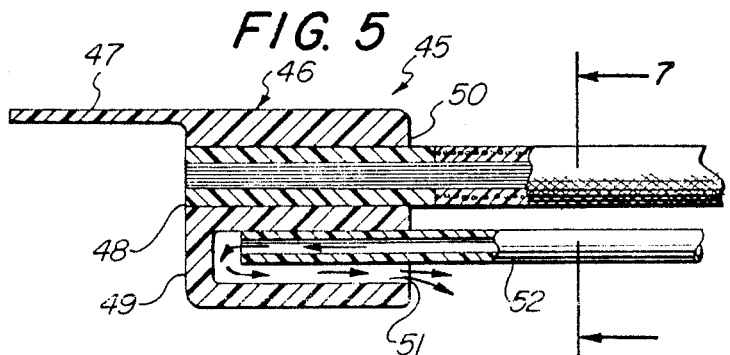
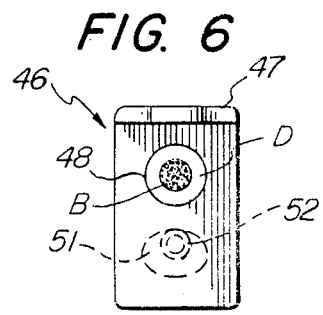
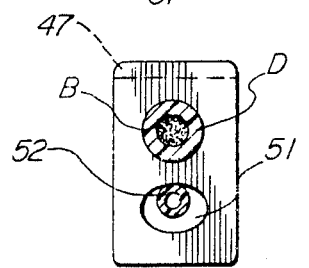

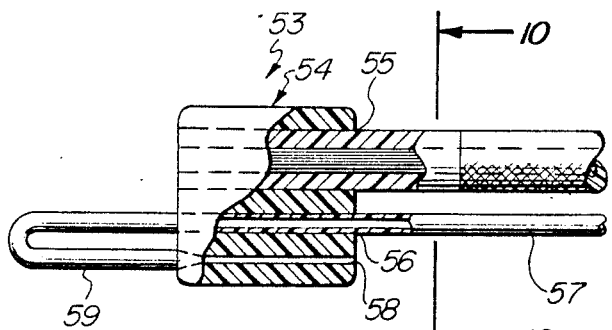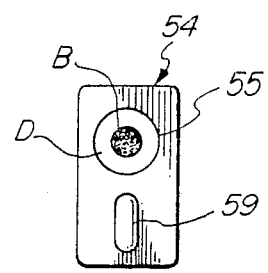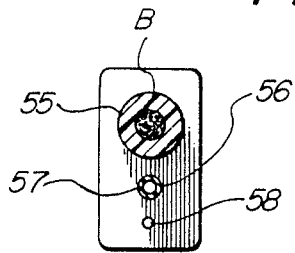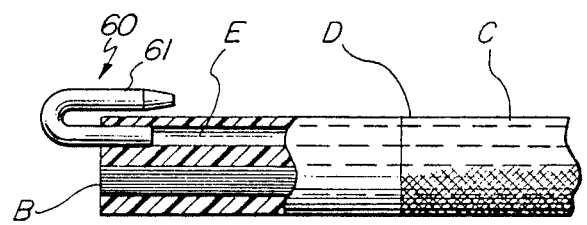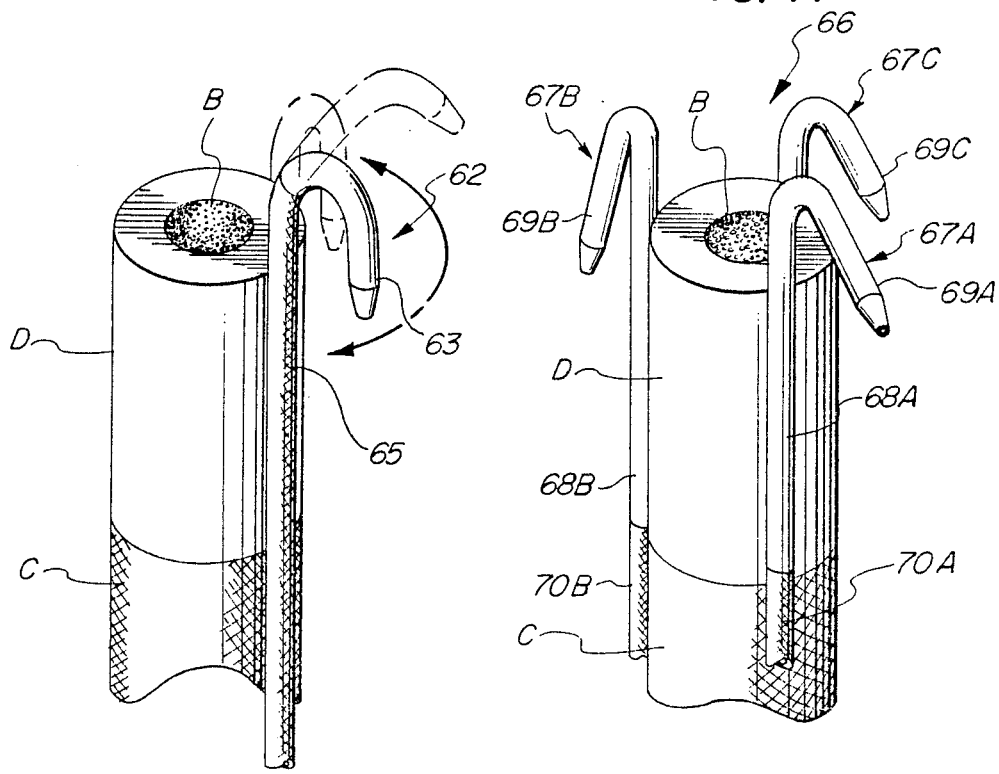
FIG. 8  FIG. 9  FIG. 10  FIG. 11  FIG. 12  FIG. 13

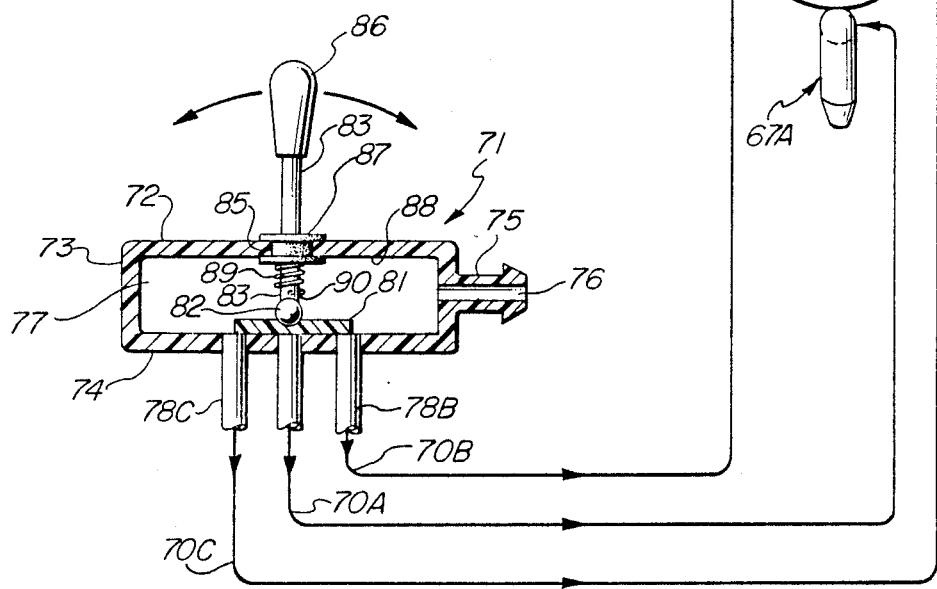
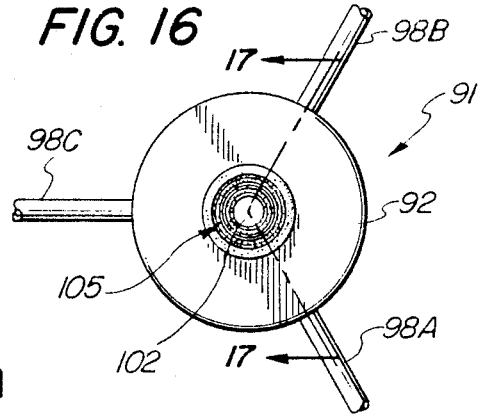
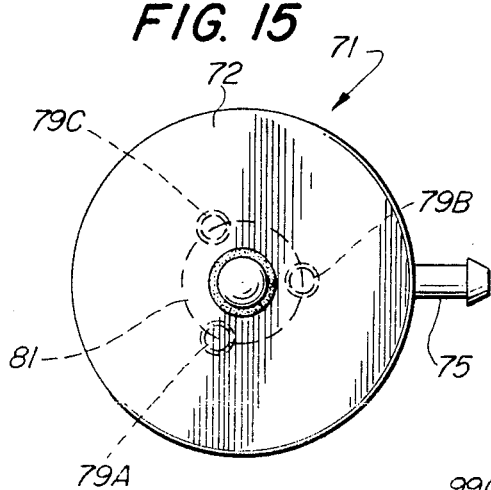
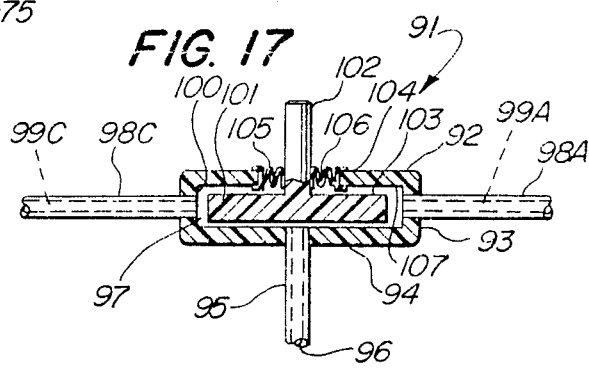

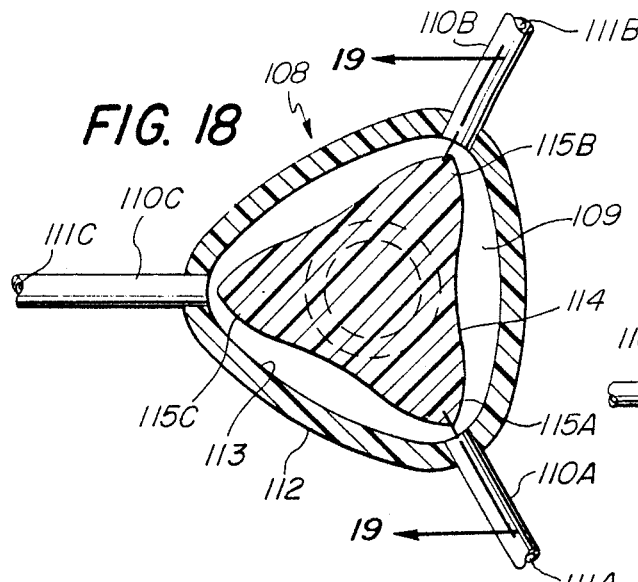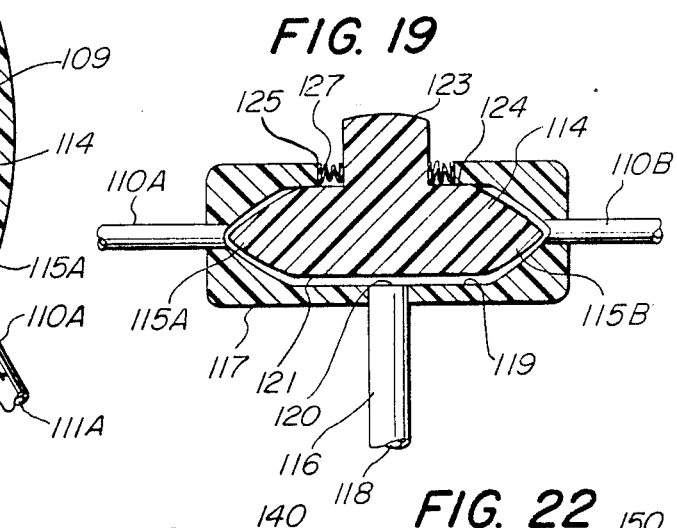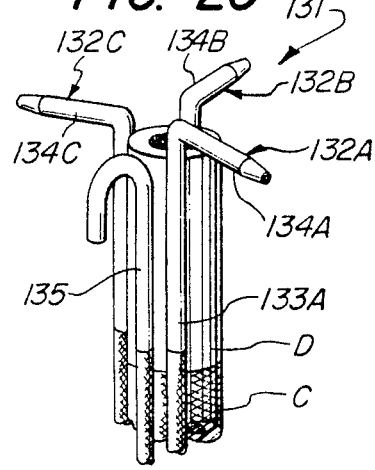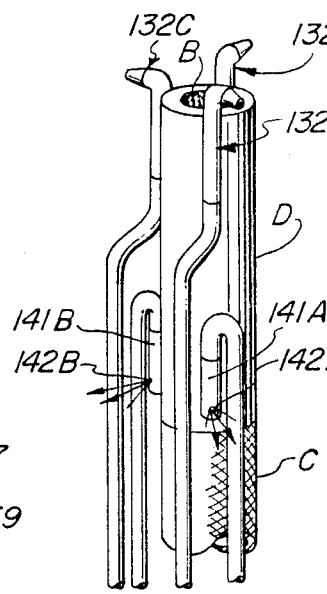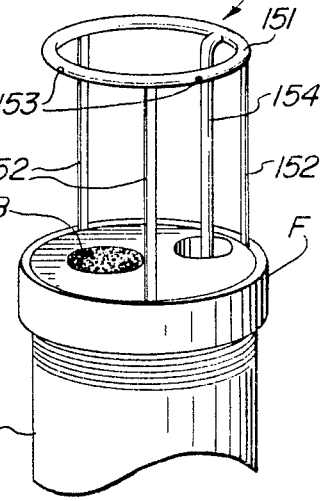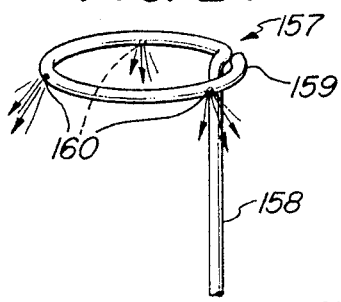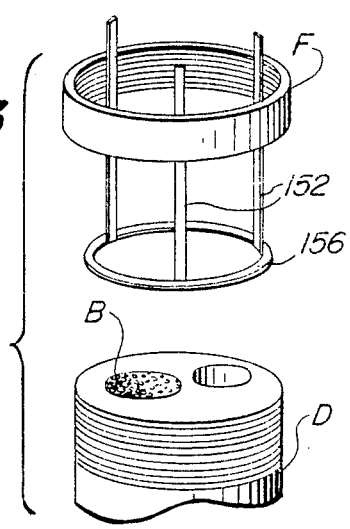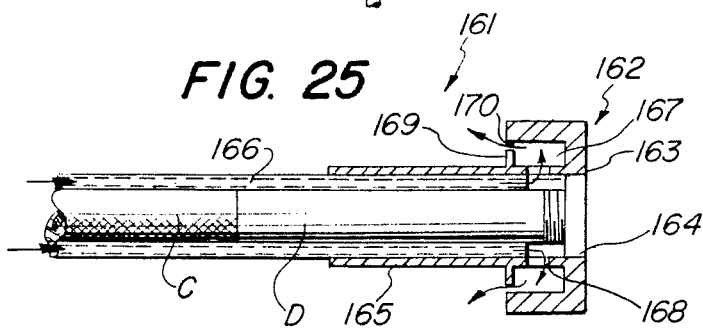

METHOD AND APPARATUS FOR FLUID PROPELLED BORESCOPES

BACKGROUND OF THE INVENTION

A. Field of the Invention

The present invention relates to means for propelling a flexible borescope. More particularly, the invention relates to a method and apparatus for propelling, and steering from a remote location, the head of a fiber-optic borescope.

B. Discussion of Background Art

Borescopes are elongated optical devices capable of transmitting visual images to a remote observer. The devices are used to transmit images of objects near the distant end of the device to an observer at the near end of the device. This permits the observer to perform a visual inspection of remote objects within the field of view of the far end of the device. The original devices were used to inspect the bores of guns, hence the name. Presently borescopes are used to facilitate inspection of a large variety of objects located in remote, inaccessible or hazardous areas. Thus, they are used in such diverse applications as the inspection of turbine engines, human bodies, and nuclear reactors.

The first borescopes were essentially elongated tubular microscopes which employed a series of lenses to convey an image of an object in the field of view of a field lens at a remote end of the tube to an objective lens at the observer's end of the tube. Usually, means were also provided to illuminate the field of view of the borescope, as for example by a small lamp located near the remote end of the tube.

Modern borescopes utilize flexible fiber-optic cables rather than lenses. The fiber-optic cables contain parallel bundles of fine transparent fibers, and transmit to one end of the cable an image of the area within the field of view of the opposite end of the cable.

Most fiber-optic borescopes have a flexible protective sheath covering the entire length of the cable. Typically, the sheath is made of a durable, abrasive resistant material such as woven metal. Also, most fiber-optic borescopes include within the sheath a second fiber-optic cable which is illuminated by a bright light source at the observer's end. The second cable transmits light to the remote end of the cable, which then illuminates the field of view of the imaging fiber-optic cable.

A relatively recent improvement in fiber-optic borescopes permits the observer at the viewing end of the borescope to remotely manipulate the distant end of the cable to position the axis of the imaging fiber-optic cable at a desired orientation, thereby bringing into its field of view a desired area of interest. These remotely manipulateable fiber-optic borescopes are referred to as articulated, articulating or articulateable borescopes. By applying tension to one or more flexible wires strung through the protective sheath and attached to a pivotable member near the remote end or head of the cable, the head may be tilted at an angle to the longitudinal axis of the cable. Such borescopes can have either one or two planes of articulation. The latter type permits aiming the head of the borescope to any point in a forward directed hemisphere (or larger portion of a sphere) centered around the head end of the cable. Siegmund, in U.S. Pat. No. 4,290,421, Sept. 22, 1981, discloses such an articulateable borescope.

Borescopes with articulated heads are somewhat easier to push through, or "snake" through, serpentine passageways in a structure being inspected. However, it is an extremely difficult, time consuming operation to thread even a borescope having two planes of articulation through a cluttered, labyrinthine series of passageways, such as those encountered in a jet turbine engine. Also, repeated pushing flexes the fiber optic bundle within the borescope cable and causes fiber damage which substantially shortens the life of the borescope. Moreover, the present methods of threading borescope cables to a desired inspection area require that the cable be in contact with a confining surface, such as a floor section of, or a tubular sheath within, the area to be inspected. Thus, present borescopes do not have the capability of being propelled to an arbitrary point in three dimensional space.

Difficulties are also encountered in pushing a borescope head through passages of a body to examine body organs.

Borescopes used to remotely inspect body organs such as the bowel or bladder are referred to as endoscopes. Sheldon, in U.S. Pat. No. 3,279,460, Oct. 13, 1966, discloses an endoscope construction modification which facilitates forward movement of the endoscope within passages of a human or animal body. He states that flexible endoscopes, or intrascopes, as he refers to them, were found to coil easily in the passages of the body, or to get stuck at the sharp angulations of the examined part or passages. The construction modification described comprises the addition of an inflatable, perforated pouch to outer wall of the endoscope housing. A hollow, flexible tube connects the pouch to a controllable air supply outside of the body. Inflating the pouch causes it to expand against surbody rounding organ fluids and/or tissues, producing a clearance space for forward movement of the endoscope. Deflation of the pouch effected by air escaping through the perforated front wall of the pouch allows the fluids and/or tissues to relax to their normal unstressed position. Thus the endoscope may be propelled forward against the normally encountered resistance of the fluids and organ tissues by an intermittent wavelike motion somewhat like the peristaltic waves of a normal functioning intestine.

The present invention was conceived of primarily to overcome difficulties typically encountered in remotely propelling and guiding a borescope head to desired inspection locations within engines and structures which are relatively inaccessible. Accordingly, the present invention, although being adaptable to propelling and guiding endoscopes, does not require the cooperative interaction of the passageways through which the apparatus travels for its effective operation. Therefore, the present invention is useful for propelling and guiding borescope heads in a broad range of applications requiring inspection of inaccessible areas.

OBJECTS OF THE INVENTION

An object of the present invention is to provide a method and apparatus for propelling the head and attached cable of a flexible borescope, thereby facilitating the use of the borescope to inspect inaccessible locations, and reducing the time needed to make inspections of such locations using the borescope.

Another object of the invention is to provide a method and apparatus for propelling a flexible borescope in directions controlled by means located at a point distant from the borescope head.

Another object of the invention is to provide an improvement in flexible borescopes which permits an observer to propel and guide the borescope head to a desired inaccessible area to be inspected.

Another object of the invention is to provide a method and apparatus for propelling and guiding a flexible borescope to any point in a three-dimensional space without requiring a support surface for the borescope cable.

Another object of the invention is to provide an accessory for flexible borescopes which provides the capability of remotely propelling and guiding the direction of motion of the borescope head.

Another object of the invention is to reduce fatigue and ultimate damage to borescope cable fibers by reducing the need for flexing the cable in order to push it through serpentine passageways, thereby extending the useful life of the cable.

Various other objects and advantages of the present invention, and its most novel features, will be particularly pointed out hereinafter in connection with the appended claims.

It is to be understood that although the invention disclosed herein is fully capable of achieving the objects and providing the advantages mentioned, the structural and operational characteristics of the invention described herein are merely illustrative of the preferred embodiments. Accordingly, we do not intend that the scope of our exclusive rights and privileges in the invention be limited to the details of construction and operation described. We do intend that reasonable equivalents, adaptations and modifications of the various embodiments and alternate forms of the present invention which are described herein be included within the scope of the invention as defined by the appended claims.

SUMMARY OF THE INVENTION

Briefly stated, the present invention comprehends the use of one or more reaction jets attached to the head of a flexible borescope to propel and guide the borescope head to inaccessible locations which it is desired to view. Each jet is powered by compressed air or other pressurized fluid, supplied to the jet by a flexible tube running back alongside or through the borescope cable to an external source of pressurized fluid.

The basic embodiment of the invention uses a rearward directed reaction jet to propel forward the borescope head to which it is attached. Other embodiments of the invention use a plurality of generally rearward-directed, separately controllable reaction jets attached to the borescope head to produce a thrust vector which is steerable, thereby affording full three-dimensional control of the direction of travel of the borescope head. In another embodiment of the invention, reaccompoments with respect to the borescope head permit the head to be tilted or translated, without necessarily being propelled forward.

BRIEF DESCRIPTION OF THE DRAWINGS

FIG. 1 is a perspective view of the basic embodiment of the present invention, showing the invention attached to an existing articulateable borescope cable.

FIG. 2 is a front end view of the device shown in FIG. 1.

FIG. 3 is a rear end view of the device of FIG. 1.

FIG. 4 is an elevation view of a modified version of the embodiment shown in FIG. 1.

FIG. 5 is a side elevation view of a second embodiment of the apparatus according to the present invention.

FIG. 6 is a front end view of the apparatus of FIG. 5.

FIG. 7 is a rear end view of the apparatus of FIG. 5.

FIG. 8 is an elevation view of a third embodiment of the apparatus according to the present invention.

FIG. 9 is a front end view of the apparatus of FIG. 8.

FIG. 10 is a rear end view of the apparatus of FIG. 8.

FIG. 11 is an elevation view of a fourth embodiment of the apparatus according to FIG. 1 in which pressurized fluid is provided to the propulsion element of the apparatus by means of an existing spare channel in the borescope cable which the apparatus is attached to.

FIG. 12 is a perspective view of a fifth embodiment of the apparatus according to the present invention, attached to the end of an articulateable tube.

FIG. 13 is a perspective view of a sixth embodiment of the invention.

FIG. 14 is a partially sectional view of a differential air flow control valve mechanism for use with the apparatus of FIG. 13, shown schematically connected to the apparatus.

FIG. 15 is a upper plan view of the valve mechanism of FIG. 14.

FIG. 16 is an upper plan view of an alternate differential air flow control valve mechanism for use with the apparatus of FIG. 13.

FIG. 17 is a partially sectional view of the valve mechanism of FIG. 16, taken along line 17—17 of FIG. 16.

FIG. 18 is an upper, partially sectional view of a modification of the valve mechanism of FIGS. 16 and 17.

FIG. 19 is a partially sectional view of the mechanism of FIG. 18, taken along line 19—19 of FIG. 18.

FIG. 20 is a perspective view of a seventh embodiment of the apparatus according to the present invention.

FIG. 21 is a perspective view of a modification of the apparatus of FIG. 20.

FIG. 22 is a perspective view of an eighth embodiment of the apparatus according to the present invention.

FIG. 23 is an exploded perspective view of the apparatus of FIG. 22 showing how the apparatus is attached to the head of an existing fiberscope.

FIG. 24 is a perspective view of a modification of the apparatus of FIG. 22.

FIG. 25 is a sectional elevation view of a ninth embodiment of the apparatus according to the present invention.

DESCRIPTION OF THE PREFERRED EMBODIMENTS

Referring now to FIGS. 1 through 3, a device 40 for propelling a flexible borescope is shown attached to the head of a borescope. A typical borescope A which is not part of the present invention, has a central core B comprising a flexible, image conducting bundle of fine, transparent glass or plastic fibers.

Both ends of fiber-optic cable core bundle B are cut perpendicular to the axis of the fibers. The fibers of both transverse end planes of the cable are held in parallel alignment by embedding them in a solid plastic, and both end faces of the bundle are polished. Objects which fall within the conical field of view of the distant end of the fiber-optic bundle are viewable by an observer looking into the rear end of the bundle. Lenses may be provided at either or both ends of the fiber-optic bundle to suit particular viewing requirements.

The fiber-optic core bundle B of the borescope or fiberscope, as it is sometimes referred to, is usually imbedded within a larger diameter flexible cable assembly C. The cable assembly C provides protection against damage for core bundle B. Also, the cable assembly provides a convenient conduit for transmitting light to illuminate a remote area to be observed. Frequently, the illumination is provided by a bright light source at the observer's end of the cable assembly, the light being conducted to the remote end of the cable assembly by a separate fiber-optic bundle within the cable assembly C.

The propulsion method and apparatus of the present invention is useable with all types of borescopes. Thus, for example, it may be used with borescopes which use a miniature television camera at the end of an electrical cable rather than a fiber-optic bundle, to receive and transmit images of distant objects.

A basic embodiment of the present invention is adapted for use with borescopes in which the remote head of the borescope may be bent with respect to the cable connected to the rear of the head in a desired direction by an observer at the opposite end of the fiberscope. Such borescopes are referred to as articulateable, and employ wires leading from the remote head of the borescope to the observer's end of the cable to effect bending of the head end of the borescope in a direction desired by the observer. The capability of being articulated in a single plane is referred to as two-way articulatibility, while the capability of being positioned in all planes is referred to as four-way articulatability. Siegmund, in U.S. Pat. No. 4,290,421 discloses an apparatus in which four-way or universal articulation of the end of a borescope is accomplished with a three-wire control system.

As shown in FIGS. 1 through 3, the borescope propulsion device 40 according to the present invention includes a preferably rigid, hollow tube 41 bent into the shape of a U. U-tube 41 may be fabricated from thin gauge plastic or metal tube stock.

As shown in FIG. 1, tube 41 is fastened to the outer end or head portion D of the flexible cable assembly C of articulateable borescope A. U-shaped tube 41 is disposed with both of its legs in parallel alignment with the longitudinal axis of borescope head D. One end of U-tube 41 is sealed by an air-tight joint to a flexible air supply tube 42, which extends backward parallel to cable assembly C to an external supply of pressurized air. The other end of U-tube 41 is open. Thus, when pressurized air is supplied to U-tube 41 via air supply tube 42, issuance of a backward-flowing jet of air at a relatively high velocity from the open leg of the U-tube produces a forward-directed reaction thrust force on the head D of the borescope cable assembly C. Preferably, the open leg of the U-tube is tapered, forming a convergent nozzle which increases the velocity of expelled fluid, and therefore, increases the thrust force.

Now, since the head D of borescope cable assembly C may be remotely articulated by an operating observer to point in any desired direction, an operator can control the direction of the thrust vector, by using the borescope articulation control system to aim the borescope head in a desired direction. The operator can also control the magnitude of the forward thrust force imparted to the head of the borescope by varying the pressure of air supplied to the inlet of tube 42. Thus, by applying sufficient air pressure to air supply 42 of propulsion device 40, the device and the attached borescope head can literally be flown to any desired location. The flying capability permits the borescope head to move in three dimensions, and without requiring contact of the borescope cable with a supporting surface. By pulling the entire cable assembly backwards slightly, it is possible to retract the borescope head from passageways which it has entered, and then to propel the head to different locations.

Since an observer looking into the rear end of the borescope can see what remote location the head of the borescope is pointing to, the observer can effect the propulsion and guidance of the borescope head to an inaccessible inspection area of interest. By using the method and apparatus described, it has been found possible to guide a flying borescope according to the present invention sequentially through all 9 combustors of a JT8 jet turbine engine in approximately 10 minutes. This compares with the four hours that is typically required to thread conventional borescopes through the same engine parts, if it can be done at all. Currently used methods of performing such an inspection require the use of a series of rigid sheathing tubes to guide the borescope cable. These are not required with the method and apparatus of the present invention. Thus, the time, labor, and cost savings effected by the apparatus and method of the present invention are substantial.

As may be seen best by referring to FIGS. 2 and 3, the plane of U-tube 41 is preferably tangent to the outer circumferential surface of flexible cable assembly C. This orientation minimizes the increase in the maximum diameter of the cable assembly and attached U-tube, thereby minimizing the clearance requirements for the combined borescope head and attached propulsion device.

FIG. 4 illustrates a modified version 43 of the device of FIGS. 1 through 3. In the modified version, a hollow U-tube 44 substantially identical to U-tube 41 of the basic embodiment extends some distance beyond the outer transverse plane of head D fiber-optic cable assembly C. The outward extending portion of U-tube 44 ensures that the outer transverse plane of the borescope head will not be butted up against an obscuring surface as the cable assembly is propelled forward. This assures the observer of always being able to have an unblocked field of view sufficient to permit him to guide the cable assembly to a desired inspection area. Also, the fixed distance between the entrance aperture of the borescope head and surfaces in contact with the outer end of the U-tube ensures that the surface is at the correct focal length with respect to the optical entrance aperture of the borescope head, and that points within the imaged field of view are a known repeatable distance apart.

FIGS. 5 through 7 illustrate a second embodiment 45 of the borescope head propulsion device according to the present invention. In side view, the propulsion device 45 has the shape of a generally rectangular cross-section block 46 with its long axis parallel to the longitudinal axis of head D of a borescope A to which the device is attached. The upper wall of block 46 extends forward to form the upper surface of an elongated, thin, flat tab or finger 47 which extends forward from the block. As shown in the front elevation view (FIG. 6) Finger 47 has a generally rectangular transverse cross-sectional shape. Block 46 is also shown to have a generally rectangular cross-sectional shape, although the shape is not essential to the operation of the invention, and could be oval or curved as a matter of design choice.

As shown in FIGS. 5 through 7, a longitudinally disposed, circular cross-section bore 48 extends through the entire length of block 46 from front face 49 to rear face 50 of the block. The axis of bore 48 is parallel to the upper and lower longitudinal surfaces of block 46. Bore 48 is of the proper size to fit over the outer circumferential surface of the head D of borescope A, being secured thereto by an interference fit, adhesive bonding, or any other suitable fastening means.

A smaller diameter, blind cavity 51 is bored part way forward from the rear face 50 of block 46, perpendicularly into the block. As may be seen best by referring to rear end view of FIG. 7, cavity 51 has a generally oval cross-sectional shape. An air hose 52 having a substantially smaller cross-sectional area than cavity 51 is inserted part way into the cavity, and secured to a wall of the cavity by an appropriate means, such as adhesive bonding. Clearance between the outer circumferential surface of air hose 52 and the inner walls of cavity 51 provide a passageway for air exiting under pressure from the bore of air hose 52 to escape from the cavity, exiting rearward from the cavity in a direction generally perpendicular to the rear transverse face 50 of block 46.

Borescope head propulsion device 45 functions in the same way as has been described above for the basic embodiment of the invention. Air under pressure is supplied to the inlet end of air hose 52 and controlled by a proportional valve operated by an operator at the viewing end of the cable. Air passing through air hose 52 enters cavity 51 and escapes rearward through the space between the hose and cavity, providing a rearward directed jet stream of air. That air jet produces a forward directed force on block 46 which tends to pull, in a forward direction, head D and cable assembly C of borescope A, which is attached to the block. By controlling the flow of air into air hose 52, the operator controls the thrust force applied to the device. By operating the articulation mechanism of the borescope, the operator can also aim the axis of the borescope head, and hence the thrust vector of propulsion device 45, to any desired point in space. Thus, by controlling the pressure of air supplied to air hose 52, and the aiming point of the borescope head, the propulsion device 45 and the attached borescope head can be propelled at a desired rate and guided to a desired location. Moreover, since an operator can view objects within the forward field of view of the borescope at the end of the borescope, he may propel and guide the borescope head to inaccessible areas which he desires to view. Also, since the operator can see inaccessible areas through the borescope, he can propel and guide the borescope head to areas of interest discovered during the course of inspection, such as engine components which show visual evidence of actual or potential defects.

Finger 47 extends forward from the common plane of the front face of propulsion device 45 and the head D of borescope A. Thus, the front face of the borescope head may not be placed closer to any object than the length of finger 47. This minimum spacing assures that the operator's forward visibility will not be blocked by inadvertent abutment of the front face of the borescope head, containing its optical entrance aperture, against an obscuring surface. The minimum spacing between objects and the entrance aperture in the front face of the borescope head also reduces the possibility of impact or scratch damage to the front face of the fiber optic bundle.

In the embodiments of the bcrescope head propulsion device described above, the jet thrust vector is parallel to but displaced some distance from the longitudinal axis of the borescope cable assembly to which the device is attached. As a result, a torque is produced about an axis perpendicular to the cable axis and jet tube axis, in addition to the forward thrust force. Therefore, it is necessary to apply a counterbalancing torque if it is required to move the borescope head in a straight line. The borescope articulation mechanism provides a convenient means for applying the required counterbalancing torque when it is desired to propel the borescope head parallel to the axis of the cable.

In tests using the propulsion device according to the present invention to propel borescopes, it was found that it was easy for an operator to learn to apply the necessary counterbalancing torque. However, a second, counterbalancing jet tube may be provided in a mirror image position on the side of the borescope head opposite the first jet tube, thereby resulting in thrust force without a reaction torque on the borescope head.

FIGS. 8 through 10 illustrate a third embodiment 53 of the borescope head propulsion device according to the present invention. In that embodiment, a generally rectangular cross-section block 54 has extending through the entire length of the block a longitudinal, circular cross-section bore 55 adapted to receive and retain the outer circumferential surface of the head D of a borescope. The axis of bore 55 is above the longitudinal center line of block 53, and is parallel thereto.

A smaller diameter bore 56 extends through the entire length of block 54, parallel to and below bore 55. Bore 56 is adapted to receive and retain flexible air supply tube 57. A third bore 58, of smaller diameter than bore 57, extends through the entire length of block 54, parallel to and below bore 57. Bore 58 constitutes a rearward directed jet tube, and is supplied with pressurized air by means of U-tube 59, which communicates with the front openings of air supply bore 56 and jet tube bore 58. This embodiment of the borescope head propulsion device operates in an exactly analogous manner to that described of the invention. above for the other embodiments In the embodiments of the invention described above, an external supply tube provides pressurized air to a jet tube which propels the device. If it is desired to provide a larger propulsion force to the fiberscope which the device is attached to, a heavier fluid such as water may be used to pressurize the supply tube, providing a greater mass flow rate and an accompanying increase in thrust.

As used throughout this disclosure, fluid is understood to include liquids, gases and mixtures of liquids and gases. Thus, for example, a liquid foam containing gas bubbles could be used as a propelling fluid according to the present invention. The expelled fluid could be used to treat or condition parts within an inspected area traversed by the propulsion head. An example of such an application would be the use of a corrosion-inhibiting liquid or liquid foam as a propelling fluid. Use of such a propellant would permit treating otherwise inaccessible metal parts of an apparatus being inspected, such as a turbine engine, with a corrosion inhibiting foam.

Other multi-phase mixtures in addition to foams may be used as a propelling fluid. A solid-liquid slurry would be an example of another such mixture.

In sealed or substantially enclosed inspection areas, it may sometimes be necessary or desirable to remove fluid expelled from the reaction jets into the enclosed area. Removal can be accomplished by any convenient means, such as a vacuum tube positioned with its entrance aperture at an efficient collection point for expelled fluid within the space. A vacuum tube could also be fastened to the borescope head, travelling along with the reaction jet.

Many existing fiberscopes have one or more spare channels into which the user may insert tubes to convey fluids from one end of the fiberscope cable to the other, or wires to convey electrical signals. Such an auxiliary channel may be used advantageously to convey pressurized fluid from the operator's end of the cable to the jet propulsion device of the present invention attached to the remote head of the fiberscope.

FIG. 11 illustrates a fourth embodiment 60 of the borescope propulsion device according to the present invention which utilizes an existing spare channel in a fiberscope cable assembly. In that embodiment, a hollow U-tube 61, similar to the U-tube 41 used in the basic embodiment of the invention illustrated in FIGS. 1 and 2, is connected by a fluid-tight joint to the front opening of an unused channel E of a borescope cable assembly C. The rear opening of channel E is connected to a source of pressurized fluid controllable by an operator at the rear end of the cable assembly. Aside from the fact that this embodiment of the invention uses the existing spare channel E of the borescope for conveying pressurized fluid to the jet-thrust producing U-tube 61, the operation of this embodiment is identical to that described above for the basic embodiment of the invention, which description is therefore not repeated.

Each of the embodiments of the present invention described above comprise accessories for, or modifications of articulateable borescopes. Other embodiments of the invention which provide a propulsion and guidance capability for nonarticulateable borescopes will now be described.

A fifth embodiment of the present invention is shown in FIG. 12. The embodiment shown in FIG. 12 comprises that basic version of the propulsion and guidance device according to the present invention which is useable with non-articulateable borescopes.

The embodiment 62 of the propulsion and guidance device according to the present invention and shown in FIG. 12 comprises essentially a U-tube 63 sealingly coupled to an internal channel 64 of an articulateable cable assembly 65. Any suitable means may be used to provide an articulating capability to the end of cable assembly 65. Cable assembly 65 is fastened near its front end to the front end of a borescope A in parallel alignment with the borescope head D. Borescope A need not have its own articulation capability. Pressurized fluid is supplied to the rear opening of channel 64. The quantity of the fluid supplied is controlled by an operator, and the aiming point of the flexible end of articulateable cable assembly 65, and hence the direction of the reaction thrust vector of the jet stream issuing from the rear orifice of the nozzle end of U-tube 63, is controlled by an operator exactly as has been described above for the other embodiments of the invention. Since the articulateable cable assembly is fastened to head D of borescope A, the borescope head will be propelled and guided in unison with the articulateable cable assembly 65. Thus, as shown in the phantom views of FIG. 12, the flexible end of articulateable cable assembly 65 may be remotely manipulated, placing the ends of the cable assembly and attached propulsion device 62 in different orientations with respect to the parallel longitudinal axes of cable assembly 65 and borescope head D.

In a modification of the embodiment 62 of the propulsion device shown in FIG. 12, cable assembly 65 need only have articulateability in a single plane. Assuming, for example, that the plane contains the longitudinal center lines of cable assembly 65 and borescope head D, the thrust vector of the nozzle end of tube 63 may be varied in the plane from its backward pointing position to a forward pointing position, i.e., for a total angular excursion of 180 degrees. Now if borescope head D may be rotated 360 degress, for example, by rotating the operator's end of the cable assembly C to which the borescope head is attached, the thrust vector of U-tube 63 may be aimed in any arbitrary direction. Thus, articulateability in a single plane of cable assembly 65 in combination with rotatability of the borescope head D about it own longitudinal axis permits the thrust vector of propulsion device 65 to be oriented in any direction in three-dimensional space.

A second modification of embodiment 62 of the invention propulsion device shown in FIG. 12 permits the thrust vector direction of the nozzle end of U-tube 63 to be varied in a plane containing the U-tube, without requiring any articulateability of cable assembly 65. In this modification, U-tube 63 is made of a flexible material, and has a restricted diameter nozzle opening. Therefore, when the pressure of fluid conducted into U-tube 63 by cable assembly 65 becomes sufficiently large, an outward directed, radial force will be exerted differentially on the walls of the curved portion of the tube, tending to straighten it out, i.e., decreasing the bend radius. This bending action is the basis for operation of a sealed tube used in Bourdon-type pressure guages. Such tubes are referred to as Bourdon tubes.

Thus, by varying the pressure of fluid supplied to U-tube 63, the bend radius and hence the thrust vector direction of the tube can be varied by the Bourdon effect. Combined with the rotatability of the borescope head to which it is attached, the use of a Bourdon-type tube for U-tube 63 permits cable assembly 65 to be merely a fluid supply tube, yet permitting the thrust vector of the U-tube to be aimed in any desired direction.

A sixth embodiment of the borescope head propulsion and guidance device according to the present invention is shown in FIG. 13. The embodiment 66 shown in FIG. 13 is also useable with fiberscopes not having an independent articulation capability.

As shown in FIG. 13, propulsion and guidance device 66 includes three elongated hollow jet tubes 67 having straight rear sections 68. Rear sections 68 of jet tubes 67 are fastened to the outer cylindrical surface of head D of borescope A, in parallel alignment with the longitudinal axis of the borescope head. Tubes 67 are disposed at 120° increments around the circumference of borescope head D. Other tube arrays are of course possible, such as four tubes at 90° increments.

The forward sections 69 of jet tubes 67 bend outward from the central axis of borescope head D, and backwards at acute angles to the central axis. Thus, the center lines of the rear portions of forward sections 69 of jet tubes 67, which define the direction of jet streams which may issue from the rear orifices of the forward sections, each define an acute angle with the axis of the borescope head, and a 120° degree circumferential angle with respect to each adjacent jet tube.

The rear opening in the rear section 68 of each jet tube 67 is sealingly joined to a flexible, hollow air supply tube 70 which extends backward along cable assembly C to an external supply of pressurized air. Thus, when pressurized air is supplied to a jet tube 67, issuance of a backward flowing jet of air, at a relatively high velocity, from the rear orifice of forward section 69 of the jet tube produces a reaction thrust force on head D of cable assembly C having a forward directed component. Also, since the axis of forward section 69 of each jet tube 67 is inclined to the longitudinal axis of the head, a bending moment is also applied to the head as a result of the radial component of the thrust produced by the jet.

If the mass flow rate of fluid expelled from out of the three jet tubes 67 is equal, the three bending moments cancel each other out, resulting in a force vector which lies entirely along the longitudinal axis of head D of fiberscope A. Thus, if the air flow rates in each air supply tube are all the same magnitude, a purely longitudinal, forward directed force will be exerted on fiberscope head D.

If the air flow rates in each air supply tube 70 for each jet tube 67 are not all equal, a net bending moment will be applied to borescope head D. Thus, by controlling the air flow rates in each supply tube 70 to a specified differential value, the borescope head and flexible cable assembly C attached to the head may bent to a desired aim point, and propelled thereto.

A differential control valve for providing controllable differential air flow rates to jet tubes 67 of propulsion device 66 is shown in FIGS. 14 and 15. As shown in the Figures, control valve 71 has the general shape of a hollow cylindrical box with a disc-shaped cover 72, a cylindrical side wall 73, and a disc-shaped base 74. A hollow inlet tube 75 projects radially outwards from cylindrical side wall 73, the bore 76 of the inlet tube communicating with the interior space 77 of the valve.

The valve outlet tubes 78A, 78B and 78C project perpendicularly downwards through disc-shaped base 74 of valve 71. The bores 79A, 79B and 79C of the outlet tubes communicate with the interior space 77 of the valve, and the upper transverse surfaces of the outlet tubes extend upwards no further than the upper wall surface 80 of disc-shaped base 74. Valve outlet tubes 78A, 78B and 78C are spaced at 120° increments on a circular trace, as may be seen best by referring to FIG. 13. Outlet tubes 78A, 78B and 78C are coupled with airtight joints to flexible air supply tubes 70A, 70B and 70C, which in turn are connected to jet tubes 67A, 67B and 67C of propulsion device 66.

A generally disc-shaped slide valve element 81 is slidably positioned above bores 79A, 79B and 79C of outlet tubes 78A, 78B and 78C, thereby permitting selection of differing air flow rates each tube from the interior space 77 of valve 71, as will now be described.

As may be seen best by referring to FIG. 14, a pivot ball 82 is fastened to the upper surface of slide valve element 81, centered on the longitudinal center line of the valve element. An elongated cylindrical valve operating rod 83 has a concave, disc-shaped cavity 84 at its lower end which fits conformally over pivot ball 82. Operating rod 83 extends upward through a central hole 85 in disc-shaped cover 72 of control valve 71. The upper end of operating rod 83 is covered with a cylindrical boot 86 to provide a convenient grasping surface for the thumb and forefinger of an operator.

As shown in FIG. 14, a flexible, annular-shaped rubber diaphragm 87 fits coaxially over operating rod 83, forming an airtight seal. Also, the outer annular surface of the diaphragm is joined in an airtight seal to lower surface 88 of disc-shaped cover 72. When valve 71 is pressurized, the pressure within interior space 77 of the valve produces a downward force on slide valve element 81, tending to keep it in flat contact with upper wall surface 80 of disc-shaped base 74. However, a downward force may be applied in the absence of pressurization by a helical compression spring 89 positioned coaxially around that portion of operating rod 83 within interior space 77 of valve 71. The upper coil of compression spring 89 abuts lower surface 88 of disc-shaped cover 72, while the lower coil of the spring passes through a transverse hole 90 in the lower end of operating rod 83, just above concave cavity 84. Thus positioned, compression spring 89 applies a downward bias force on operating rod 83, and therefore, on disc-shaped valve element 81, keeping the lower surface of valve element 81 in intimate contact with the upper wall surface 80 of disc-shaped base 74.

As may be seen best by referring to FIG. 15, with operating rod 83 in a vertical or neutral position, disc-shaped valve element 81 obstructs equal cross-sectional areas of bores 79A, 79B and 79C of valve outlet tubes 78A, 78B and 78C. In this position air flow rates to each jet tube 67A, 67B and 67C of propulsion device 66 will be equal, producing a forward reaction thrust vector colinear with the longitudinal axis of borescope head D to which jet tubes 67A, 67B and 67C are attached. The magnitude of the forward directed thrust vector may be controlled by controlling the pressure of air supplied to the inlet tube 75 of control valve 71.

If the upper end of operating rod 83 is pivoted in a vertical plane towards valve outlet tube 78C sufficiently far, disc-shaped valve element 81 will completely cover bores 79A and 78B of outlet tubes 78A and 78B, and completely uncover bore 79C of outlet tube 78C. Thus, with operating rod 83 pivoted to the described position, maximum air flow will be provided to jet tube 67C supplied by valve outlet tube 78C, while no pressurized air will be provided to jet tubes 67A and 67B. Accordingly, only jet tube 67C will produce thrust, resulting in a forward thrust component and a moment tending to bend borescope head D in a plane containing the longitudinal axis of head D and jet tube 67C, in a direction away from jet tube 67C. The magnitude of this force can be increased or decreased by increasing or decreasing the pressure of air supplied to inlet tube 75 of valve 71.

In an exactly analogous fashion to that described above, operating rod 83 may be swivelled by an operator to any position within a cone defining the maximum deviation of the center line of the operating rod from the center line of valve 71. In that way, an operator can aim the resultant thrust vector of jet tubes 67A, 67B and 67C in any desired direction, permitting the operator to fly the attached borescope head to any desired location. Operating rod 83 thus functions as a 3 joy stick, similar in function to the joy stick used to control the flight direction of an airplane.

A second embodiment of a differential control valve assembly useable with propulsion device 66 is shown in FIGS. 16 and 17. As shown in the Figures, differential control valve 91 includes a hollow generally cylindrical box having a disc-shaped cover 92, cylindrical side wall 93, and a disc-shaped base 94. A hollow inlet tube 95 projects perpendicularly downward from disc-shaped base 74, coaxial with the cylindrical axis of valve 91. The bore 96 of inlet tube 95 communicates with the interior space 97 of the valve.

Three valve outlet tubes 98A, 98B and 98C project radially outward from cylindrical side wall 93 of valve 91. Valve outlet tubes 98A, 98B and 98C are spaced at 120° increments around the circumference of cylindrical side wall 93. The bores 99A, 99B and 99C of the valve outlet tubes communicate with the interior space 97 of the valve. The inner transverse surface planes of the outlet tubes extend radially inward no further than the inner circumferential wall surface 100 of cylindrical side wall 93 of the valve. Outlet tubes 98A, 98B and 98C are coupled with airtight joints to flexible air supply tubes 70A, 70B and 70C, which in turn are connected to jet tubes 67A, 67B and 67C of propulsion device 66.

A generally disc-shaped slide valve element 101 is positioned in a generally coaxial position within the cylindrical interior space 97 of valve 91. Slide valve element 101 includes an elongated, coaxial, cylindrical operating rod 102 which extends perpendicularly upwards from the flat upper surface 103 of the valve element. Operating rod 102 extends upward through a central hole 104 in disc-shaped cover 92 of control valve 91.

As shown in FIG. 17, a flexible annular-shaped rubber diaphragm 105 fits coaxially over the outer circumferential surface of operating rod 102, and makes an airtight seal with that surface. Diaphragm 105 has a series of radially disposed convolutions 106 which gives the transverse cross-sectional view of the diaphragm an undulating, wave-like appearance. The outer annular surface of diaphragm 105 is joined in an airtight seal to the lower surface 107 of disc-shaped cover 92.

The convolutions 106 in diaphragm 105 permit an operator to move operating rod 102 and integral disc-shaped slide valve element 101 in a desired radial direction away from the cylindrical axis of valve control mechanism 91. The flexibility of diaphragm 105 also permits operating rod 102 and slide valve element 101 to be moved up and down with respect to disc-shaped base 94 of the inlet tube. By moving slide valve element 101 downwards towards the entrance to bore 96 of air inlet tube 95, air flow into interior space 97 of valve 91 is reduced. This reduces the rates of air flow out through valve outlet tubes 98A, 98B and 98C, thereby decreasing the thrust of jet tubes 67A, 67B and 67C which are supplied with air from the valve outlet tubes. Thus, by applying varying amounts of downward pressure on operating rod 102, an operator can diminish or increase the magnitude of thrust applied to propulsion device 66.

By moving operating rod 102 and slide valve element 101 from a central, neutral position radially outwards towards a valve outlet tube 98A, 98B or 98C, the flow rate of air issuing from the outlet tube can be diminished with respect to the flow rates of air issuing from the valve outlet tubes, which the slide valve element is moved away from. In this way, an operator can aim the resultant thrust vector of jet tubes 67A, 67B and 67C in any desired direction, permitting the operator to fly the attached borescope head to any desired location A modified version of valve control mechanism 91 is shown in FIGS. 18 and 19. As may be seen best by referring to FIG. 18, modified control valve 108 has a working space 109 having in a transverse cross-sectional view the general shape of an equilateral triangle, as compared with the circular-shaped working space of valve 91. The transverse outline of working space 109 deviates from that of a triangle in that the sides of the outline are convex rather than straight, and join each other in arcuate, as opposed to angular vertices.

Three valve outlet tubes 110A, 110B and 110C project radially outward from the vertical side walls of valve 108, the center lines of each tube bisecting a separate one of each of the three interior angles of the working space 109. Thus, valve outlet tubes 110A, 110B and 110C are spaced at 120° increments around the periphery of side wall 112 of valve 108. The bores 111A, 111B and 111C of the valve outlet tubes communicate with the interior space 109 of the valve, and the inner transverse planes of the outlet tubes extend radially inward no further than the inner wall surface 113 of side wall 112.

As shown in FIG. 18, valve 108 includes a slide valve element 114 having in a transverse cross-sectional view the general outline of a trefoil. The distance below the center of the trefoil shape and the outer surface of each convex trefoil lobe 115 of valve element 114 is slightly less than the distance between the center of triangular working space 109 and each of its vertices, thus permitting movement of the valve element lobes away from or towards a selected valve outlet tube. However, the minimum transverse dimension of valve element 114 is sufficiently large to prevent substantial rotation of the element, thereby confining each lobe 115 to the vicinity of a particular vertice and associated valve outlet tube of triangular working space 109.

As may be seen best by referring to FIG. 19, working space 109 of vlave 91 has, in a central longitudinal cross-sectional view, generally flat parallel upper and lower surfaces, and convex, arcuate sides disposed symmetrically about the axis of each valve outlet tube. A hollow inlet tube 116 projects perpendicularly downwards from the base 117 of valve 108. The bore 118 of the inlet tube 116 communicates with the working space 109 of the valve.

Slide valve element 114 includes an elongated, coaxial cylindrical operating rod 123 which extends perpendicularly upwards from the flat upper surface 124 of the valve element. Operating rod 123 extends upward through a hole 125 in the transverse upper wall 126 of valve 108. A flexible, annular-shaped, convoluted diaphragm 127 forms an airtight seal between operating rod 123 and upper wall 126 of valve 108.

Modified valve 108 is used to control the magnitude and direction of thrust provided by jet tubes 67A, 67B and 67C exactly as has been described above for the basic embodiment 91 of the valve shown in FIGS. 16 and 17. In modified version 108, more positive control of the difference between flow rates of air issuing from each valve outlet tube is made possible by the cooperative interelationship between the convex arcuate shapes of the lobes 115 of the slide valve element 104 and the complementarily shaped concave regions of the valve housing centered around each valve outlet tube.

FIG. 20 illustrates a seventh embodiment of the propulsion and guidance device according to the present invention.

As shown in FIG. 20, the seventh embodiment 131 of the propulsion on and guidance device according to the present invention includes three hollow, elongated jet tubes 132. Each jet tube 132 is preferably formed from a single cylindrical tube which has had a right angle bend imparted to it, forming a straight rear section 133 and a shorter front section 134 extending outwards at ninety degrees with respect to the rear section. Rear sections 133 of jet tubes 132 are fastened to the alignment with the longitudinal axis of the borescope head. Jet tubes 132 are disposed at 120° increments around the circumference of borescope head D. The axis of each front section 134 of each jet tube 132 is radially disposed with respect to the longitudinal axis of borescope head D. Thus, when pressurized air is differentially supplied to jet tubes 132, as for example by one of the three valves described above, a bending moment of controlled magnitude and direction will be applied to borescope head D, permitting the head to be aimed in a desired direction.

Propulsion of guidance and propulsion device 131 is provided by supplying air under pressure to U-shaped propulsion tube 135. Propulsion tube 135 is fastened to the outer cylindrical surface of head D of borescope A, in parallel alignment with the longitudinal axis of the borescope head. Preferably, propulsion tube 135 is spaced midway between pairs of adjacent jet tubes 132.

In some applications for the borescope propulsion and guidance device according to the present invention, it would be desirable to have the capability of translating the head of a borescope without tilting it and without moving it forward or backward, in the manner of a cobra raising its head while maintaining the axis of its skull, and hence its line of sight, fixed in a horizontal direction. A modified version of the invention, shown in FIG. 21 provides that capability.

As shown in FIG. 21, a propulsion and guidance device 140 which is a modification of the embodiment 131 shown in FIG. 19 includes, in addition to the element of the basic embodiment additional thruster tubes 141. Thruster tubes 141 are hollow cylindrical tubes sealed at one end and having an opening at the other end for the admission of pressurized air. Thruster tubes 141 are fastened to the outer cylindrical surface of head D of borescope A, in parallel alignment with the longitudinal axis of the borescope. The thruster tubes are disposed at 120° increments around the circumference of borescope head D.

Each thruster tube 141 contains in the outer portion of its cylindrical wall a radially disposed, tapered nozzle perforation 142. The axis of each perforation is radially directed with respect to the longitudinal axis of the borescope head. Thus, when air under pressure issues from a perforation 142, a radially inwardly directed reaction force is exerted on the longitudinal center line of borescope head D. A single such reaction force would produce a bending moment on the borescope head. However, a reaction force resulting from air under pressure issuing from jet tube 132 longitudinally spaced from perforation 142 results in a counterbalancing moment. Therefore, by providing pairs of radial thrust forces by means of perforation 142 in thrust tube 141, counter-balancing the moment produced by jet tube 132, borescope head may be translated in any desired direction while maintaining its longitudinal axis in any desired orientation, as for example, horizontal.

The addition of thrusters 141 displaced rearward from jet tubes 132 permits the application of radial force moments rearward of those produced by the front jet tubes. By separately controlling the thrust produced by the front jet tubes and rear thrusters, the borescope head can be tilted as desired. In those cases where it is desired to be able to levitate or tilt a portion of the cable attached to the rear of the borescope head along with the head, additional radially directed thrusters may be installed along the length of the cable as required.

An eighth embodiment of the borescope propulsion and guidance device according to the present invention is shown in FIG. 22. The embodiment 150 shown in FIG. 22 is for use with articulateable borescopes. It may be attached as an accessory to such borescopes without increasing the diameter of the combination. Thus, the minimum size of passageways through which the borescope may travel is not increased. As shown in the Figure, propulsion device 150 includes a hollow ring 151 supported parallel to the front, transverse face of borescope head D by means of thin, elongated, longitudinally disposed support rods 152 joining the facing transverse surfaces of the ring and borescope head. Ring 151 contains a plurality of generally rearwardly directed jet holes 153, an air supply tube 154 provides pressurized air to ring 151. Air escaping from jet holes 153 imparts a forward thrust to ring 151, support rods 152 and borescope head D. As shown in the Figure, a spare channel with the borescope cable assembly C may be used to contain air supply tube 154.

FIG. 23 is an exploded perspective view of one form of the apparatus of FIG. 21 which is especially well adapted to easy attachment to an existing borescope head. In the embodiment 155 shown in FIG. 23, support rods 152 are attached at their lower ends to a solid ring 156. Ring 156 is attached to borescope head D by removing ferrule F from the borescope head, placing ring 156 flat down on the outer transverse face of the borescope head, sliding the ferrule down over hollow ring 151, support rods 152 and solid support ring 156, and threading the ferrule tightly down on the external threads of the borescope head, thereby securing the support ring to the borescope head.

FIG. 24 illustrates another modification of the ring propulsion device of FIGS. 22 and 23. In the embodiment 157, an air supply and support tube 158 is formed with an integral propulsion ring 159 having a plurality of rearwardly directed jet holes 160.

A ninth embodiment of the propulsion and control device according to the present invention is shown in FIG. 25. That embodiment is intended for use with articulateable borescopes.

The embodiment 161 shown in FIG. 25 uses an air supply tube mounted coaxially over cable assembly C of borescope A to supply pressurized air to propulsion head 162 of the device.

Propulsion head 162 includes a generally cylindrical cap 163 having a central hole 164 adapted to fit over borescope head D, and a rearward extending, coaxial, cylindrical flange 165 adapted to insertibly receive air supply tube 166. An annular space 167 is formed between the inner circumferential wall of cap 163 and the outer circumferential wall of cylindrical flange 165. Perforations 168 are provided in the cylindrical wall of flange 165, allowing pressurized air to enter annular space 167 from air supply tube 166. A flat, annular-shaped ring 169 fastened coaxially around the outer circumferential wall of coaxial flange 165 is positioned in longitudinal alignment with the rear transverse surface of cylindrical cap 163, and is sealingly joined to the inner circumferential wall of the cap. Annular ring 169 contains a plurality of jet holes 170 spaced at regular circumferential angles. Thus, pressurized air in annular space 167 may escape rearward through jet holes 170, providing forward thrust to propulsion head 162.

In a variation of the embodiment of the propulsion and guidance device shown in FIG. 13, means are provided to vary the ratio between radial and longitudinal thrust vectors for a given jet tube as a function of air pressure. Thus, if jet tube 67 is made somewhat flexible, sufficiently high air pressure within the tube will cause the tube to bend in a direction which decreases its original bend radius, i.e., in a direction which increases the intersection angle between the longitudinally disposed rear portion and angled side portion of the jet tube. Thus, higher air pressure supplied to a flexible jet tube will increase the radial component of thrust relative to the longitudinal component.

In those embodiments of the propulsion and control device according to the present invention which use multiple jet tubes to effect steering, such as those shown in FIGS. 13 and 19, reduction of the number of air supply tubes required is possible. By providing a selector valve in the borescope head which is remotely controllable be means of electrical control wires or the like, only a single supply tube for pressurized air need be connected to the head.

In another variation of the present invention, a gas generator located within the borescope head would be remotely controlled to provide pressurized gas to selected propulsion jets. guiding a borescope by fluid driven reaction jets described above, it has been assumed that guidance commands were generated by a human operator who used the image transmitting capabilities of the borescope to visually guide the bcrescope head to a desired location It would be within the spirit of the present invention to use means other than a human operator to generate guidance signals for use by the invention. Moreover, the propulsion and guidance method and apparatus according to the present invention could be used to propel and guide sensors different than imaging borescopes.

For example, if the propulsion and guidance device according to the present invention were attached to a magnetometer head at the remote end of a flexible cable, a conventional serve control module at the proximal end of the cable could generate command signals for the device which would propel the magnetometer head to regions experiencing anomalous magnetic fields. In an exactly analgous fashion, sensors responsive to other influences, such as ionizing radiation from radioactive materials, could be used to generate command signals for the propulsion and guidance devices according to the present invention, propelling and guiding the sensor to regions of high or low magnitudes of such influences, as desired.

What is claimed is:

1. A method for propelling through a media a sensor situated at the distal end of an elongated conduit adapted to carry signals from said sensor to the proximal end of said conduit comprising expelling into said media fluid from said distal end of said conduit supled from a source external to said media, thereby producing on said conduit a reaction force in a direction opposite to the flow direction of said expelled fluid.

2. The method of claim 1 further comprising controlling the direction of flow of said expelled fluid.

3. The method of claim 2 wherein said flow direction of said expelled fluid is controlled, at least in part, by controlling the spatial orientation of said distal end of said conduit.

4. The method of claim 3 further comprising controlling the rate of flow of said expelled fluid.

5. The method of claim 2 wherein said flow direction of said expelled fluid is controlled, at least in part, by controlling the spatial orientation of the flow vector of said expelled fluid relative to the spatial orientation of said distal end of said conduit.

6. The method of claim 5 further comprising controlling the rate of flow of said expelled fluid.

7. The method of claim 2 wherein said controlling of said flow direction of said expelled fluid is at least partially responsive to said sensor signals.

8. The method of claim 7 wherein said sensor signals are effective in forming an image of at least a portion of the region in space occupied by said sensor.

9. The method of claim 1 further comprising controlling the rate of flw of said expelled fluid.

10. A method for propelling and guiding a sensor situated at the distal end of an elongated conduit adapted to carry signals from said sensor to the proximal end of said conduit comprising:
    (a) conducting fluid under pressure from the region near the said proximal end of said conduit to said distal end of said conduit,
    (b) expelling fluid from said distal end of said conduit, thereby producing a reaction force on said conduit in a direction opposite to the flow direction of said expelled fluid, and
    (c) controlling the direction of flow of said expelled fluid.

11. The method of claim 10 further comprising controlling the rate of flow of said expelled fluid.

12. The method of claim 11 wherein said controlling of said flow direction and said rate of flow of said expelled fluid is at least partially responsive to said sensor signals.

13. The method of claim 12 wherein said flow direction of expelled fluid is controlled, at least in part, by controlling the spatial orientation of said distal end of said conduit.

14. The method of claim 12 wherein said flow direction of said expelled fluid is controlled, at least in part, by controlling the spatial orientation of the flow vector of said expelled fluid relative to the spatial orientation of said distal end of said conduit.

15. A method for remotely propelling and guiding through a media a sensor at the distal end of a flexible cable carrying signals from said sensor to the proximal end of said cable comprising expelling from a point near said distal end of said cable fluid supplied from a source external to said media, thereby producing on said distal end of said cable a reaction force in a direction opposite to the flow direction of said expelled fluid, said force thereby tending to move said distal end of said cable and said sensor.

16. The method of claim 15 further comprising controlling the direction of flow of said expelled fluid, thereby controlling the direction of said reaction force.

17. The method of claim 16 further comprising controlling the rate of flow of said expelled fluid, thereby controlling the magnitude of said reaction force.

18. The method of claim 17 wherein said controlling of said flow direction and said rate of flow of said expelled fluid is at least partially responsive to said sensor signals.

19. The method of claim 18 wherein said sensor signals are effective in forming at said proximal end of said cable an image of at least a portion of the region in space occupied by said sensor at said distal end of said cable.

20. The method of claim 19 wherein said flow direction of said expelled fluid is controlled, at least in part, by controlling the spatial orientation of said distal end of said cable.

21. The method of claim 20 wherein said expelled fluid is supplied from the region near the proximal end of said cable and conducted to said distal end of said cable.

22. The method of claim 19 wherein said flow direction of said explled fluid is controlled, at least in part, by controlling the spatial orientation of the flow vector of said expelled fluid relative to the spatial orientation of said distal end of said conduit.

23. The method of claim 22 wherein said expelled fluid is supplied from the region near the proximal end of said cable and conducted to said distal end of said cable.

24. A device for propelling through a media a sensor fastened to the distal end of a conduit adapted to carry signals from said sensor to the proximal end of said conduit comprising:
(a) a source of pressurized fluid external to said media, and
(b) means for expelling said fluid from said distal end of said conduit, thereby producing on said distal end of said conduit a reaction force in a direction opposed to the flow direction of said expelled fluid.

25. The device of claim 24 further comprising means for controlling the direction of flow of said expelled fluid.

26. The device of claim 25 further comprising means for controlling the rate of flow of said expelled fluid.

27. The device of claim 26 wherein said means for controlling the direction of flow of said expelled fluids comprises in combination:
(a) means for maintaining said flow direction of said expelled fluid at a desired orientation relative to said distal end of said conduit, and
(b) means for controlling the spatial orientation of said distal end of said conduit;

28. The device of claim 26 wherein said means for controlling the flow direction of said expelled fluid comprises means for controlling the spatial orientation of the vector direction of said reaction force on said distal end of said conduit.

29. A device for propelling through a media in a desired direction the distal end of a flexible cable having means for controlling the bending of said distal end of said cable from the proximal end of said cable comprising:
(a) at least one reaction jet fastened to said cable near its distal end, and
(b) means for expelling pressurized fluid supplied from a source external to said media from said reaction jet, thereby producing on said distal end of said cable a reaction force in a direction opposite to the direction of flow of said fluid expelled from said reaction jet.

30. The device of claim 29 wheren said pressurized fluid is conducted from a source at the proximal end of said cable to said reaction jet at said distal end of said cable by a hollow flexible hose paralleling the span of said cable.

31. The device of claim 30 wheren said hose is contained within said cable.

32. The device of claim 31 wherein said open leg of said U-tube is disposed in a generally rearward direction with respect to said distal end of said cable.

33. The device of claim 30 wheren said reaction jet comprises a hollow, generally U-shaped tube fastened to the distal end of said cable with both legs facing in a generally rearward direction relative to the distal end of said cable, one leg of said tube being sealingly joined to said hollow flexible hose, the other leg being open to permit pressurized fluid to be expelled therefrom.

34. The device of claim 33 wherein the convex arcuate outer surface of said U-tube extends longitudinally beyond the distal transverse plane of the end of said cable, thereby setting a lower limit to the approach distance of said transverse end of said cable to a plane.

35. A device for propelling in a desired direction the distal end of a flexible cable having means for controlling the bending of said distal end of said cable from the proximal end of said cable comprising:
(a) an elongated block having a generally uniform transverse cross-section, said block having near its upper longitudinal surface a bore longitudinally disposed through its front and rear planes adapted to insertably receive the outer surface of said distal cable end,
(b) a reaction jet, coupled to said block, and
(c) a flexible supply hose to provide pressurized fluid to said reaction jet.

36. The device of claim 35 wherein said reaction jet comprises an oval cross-section, blind cavity bored part way into said block perpendicularly from the rear face of said block, said cavity having a cross-sectional area larger than said flexible supply hose, said flexible supply hose being inserted part way into said cavity and fastened to a wall thereof, thereby providing an escape route for pressurized fluid within said supply hose to pressurize said cavity and exit said cavity normal to the rear face of said cavity, thereby producing a forward directed reaction thrust force on said block.

37. The device of claim 35 further comprising a longitudinally disposed protuberance extending forward beyond the front transverse plane of said distal end of said cable, thereby setting a lower limit to the approach distance of said transverse end plane of said cable to a plane.

38. The device of claim 35 wherein said reaction jet comprises a small diameter jet bore longitudinally disposed through the front and rear faces of said block near the lower longitudinal surface of said block, said block being further defined as having an intermediate diameter bore disposed through the front and rear faces of said block parallel to and intermediate to said cable bore and said jet bore, said intermediate bore being adapted to receive said supply hose, and a hollow U-tube sealingly coupled to the front openings of said supply hose bore and said jet bore, thereby providing a conduit for pressurized fluid in said supply hose to escape rearward out through the rear opening in said jet bore.

39. A device for propelling and guiding in a desired direction the distal end of a flexible sensor cable comprising:
(a) a flexible control cable having an articulateable distal end,
(b) means for fastening said distal end of said control cable to the distal end of said sensor cable,
(c) at least one reaction jet fastened to the distal end of said control cable, and (d) means for providing pressurized fluid to said reaction jet.

40. A device for propelling through a media a sensor fastened to the distal end of a conduit adapted to carry signals from said sensor to the proximal end of said conduit comprising:
(a) a plurality of reaction jets each having a distinct thrust line fastened to the distal end of said conduit,
(b) a source of pressurized fluid external to said media, and
(c) means for selectably conducting said pressurized fluid to a selected one of said reaction jets, thereby permitting control of the orientation of the thrust vector of said jets relative to the distal end of said conduit.

41. The device of claim 40 wherein said thrust lines of said reaction jets are disposed at equal circumferential angles in a plane transverse to the long axis of said distal end of said conduit.

42. The device of claim 40 wherein the thrust lines of said reaction jets are inclined with respect to the longitudinal axis of said distal end of said conduit.

43. The device of claim 40 wherein the thrust lines of said reaction jets are parallel to each other and to the longitudinal axis of said distal end of said conduit.

44. The device of claim 40 wherein the angle between the thrust lines of said reaction jets and the longitudinal axis of said conduit is dynamically controllable.

45. The device of claim 44 wherein at least a portion of said reaction jet is pivotable and the angle between the thrust line of a said reaction jet and the longitudinal axis of said conduit may be varied by varying the pressure within said reaction jet.

46. A device for propelling a sensor head fastened to the distal end of a flexible cable adapted to carry signals from said sensor head to the proximal end of said cable comprising:
(a) three hollow jet tubes, each having a generally straight base section and a generally straight tip section bent at a fixed angle relative to said base section and defining a thrust vector direction, the base section of each said jet tube being fastened to said sensor head in parallel alignment with the longitudinal axis of said sensor head, said base sections being disposed at 120 degree circumferential increments with respect to one another,
(b) a source of pressurized fluid,
(c) a hollow, flexible fluid supply hose coupling the rear bore opening of said base section of each said reaction jet to said source of pressurized fluid, and
(d) means for varying the pressure of fluid supplied to the inlet of each fluid supply hose, thereby varying the reaction thrust produced by fluid expelled under pressure from the opening in said tip section of each said reaction jet.

47. The device of claim 46 further comprising a selector valve to control the relative rates of flow of pressurized fluid to said reaction jets, thereby affording directional control of the vector sum of the individual reaction jet thrust vectors.

48. The device of claim 47 wherein said selector valve comprises:
(a) a hollow, circular cross-section cylindrical housing having a disc-shaped cover, a disc-shaped base, a radially disposed air supply tube projecting perpendicularly outwards from the cylindrical wall of said housing, the bore of said air supply tube communicating with the hollow interior of said housing,
(b) three valve outlet tube openings through the bottom disc-shaped base of said housing, said valve openings being disposed at 120-degree angles with respect to one another on a defining circle coaxial with the longitudinal center line of said housing,
(c) a disc-shaped valve body having a flat lower surface, said valve body being of the same diameter as said defining circle for said valve outlet openings, and said valve body being slidably confined within said housing with its flat bottom surface being in intimate contact with the flat upper wall surface of said disc-shaped valve-housing base, and
(d) means for slidably moving said valve body to cover a greater or smaller percentage of the cross-sectional area of the entrance bore of a selected valve outlet tube opening, thereby permitting control of the relative air flow rates from the interior space of the valve housing into the valve outlet tubes.

49. The device of claim 48 wherein said means for slidably moving said valve body comprises an elongated rod pivotably mounted to the center of the upper surface of said valve body, said rod extending generally upwards through a central perforation in the disc-shaped cover of said valve housing, the outer peripheral surface of said rod being joined to said cover in an airtight seal by a flexible annular diaphragm.

50. The device of claim 47 wherein said selector valve comprises:
(a) a hollwo circular cross-section, cylindrical housing having a disc-shaped cover, a disc-shaped base, a hollow air supply tube projecting perpendicularly downwards from the bottom surface of said disc-shaped base, the bore of said air supply tube communicating with the hollow interior of said housing,
(b) three valve outlet tubes projecting radially outwards from the cylindrical side wall of said housing, said valve outlet tubes being disposed at 120-degree increments around the circumference of said cylindrical side wall, and the bores of said valve outlet tubes communicating with the hollow interior space of said housing,
(c) a disc-shaped valve body having a flat lower surface, a flat upper surface, and a diameter slightly less than the inner diameter of said cylindrical wall of said housing, said valve body being slidably confined within said housing but movable in an axial direction, perpendicular to the flat upper surface of said disc-shaped base,
(d) means for slidably moving said valve body closer or further away from a selected valve outlet tube bore, thereby permitting control of the relative air flow rates from the interior space of the valve housing into said bores of said valve outlet tubes, and
(e) means for moving said valve body perpendicularly with respect to the upper bore opening of said air inlet supply tube, thereby affording control of the air flow rate into the said hollow interior space of said valve housing.

51. The device of claim 50 wherein said means for slidably and axially moving said valve body comprises an elongated rod rigidly and centrally mounted to the upper surface of said valve body and extending perpendicularly upwards therefrom through a central perforation in said disc-shaped cover of said valve housing, the diameter of said perforation being sufficiently larger than the diameter of said rod to permit radial movement of said rod with respect to the side walls of said perforation, the outer peripheral surface of said rod being joined to said cover in an airtight seal by a flexible annular diaphragm having in transverse cross-section a pluraltiy of wave-like convolutions, the extensibility of said diaphragm permitting radial as well as axial movement of said rod.

52. The device of claim 47 wherein said selector valve comprises:
(a) a hollow housing having a flat cover, a flat base and parallel side walls, the transverse cross-sectional shape of said housing having the general appearance of an equilateral triangle with arcuate, outwardly bowed sides and arcuate, convex vertices, and a hollow inlet air supply tube projecting perpendicularly downwards from the bottom surface of said base, the bore of said inlet air supply tube communicating with the hollow interior of said housing,
(b) three valve outlet tubes projecting radially outwards from the vertical side walls of said housing, the bore center line of each said valve outlet tube bisecting a separate vertice of said equilateral triangle, the bore of each said outlet tube flaring radially outwards to join the inner wall surface of said housing in a smooth, arcuate contour resulting in the formation of a concave outlet valve seal, and the bores of said valve outlet tubes communicating with the hollow interior space of said housing,
(c) a valve body having a generally flat and parallel upper and lower surfaces and, in transverse cross-section, the shape of a three-lobed trefoil having a maximum radial dimension permitting a samll amount of radial movement of said valve body within said triangular working space, each of said lobes having in a longitudinal sectional view a convex surface shaped complementarily to said outlet tube valve seat, said valve body being slidably confined within said housing but movable in an axial direction, perpendicular to the upper surface of said base,
(d) means for slidably moving said valve body closer to or further away from a selected valve outlet tube, thereby affording control of the realtive air flow rates out from the interior space of the valve housing into said bores of said valve outlet tubes, and
(e) means for moving said valve body perpendicularly with respect to said upper bore opening of said air inlet supply tube, therby affording control of the air flow rate into the hollow interior space of said valve housing.

53. The device of claim 52 wherein said means for slidably and axially moving said valve body comprises an elongated rod rigidly and centrally mounted to the upper surface of said valve body and extending perpendicularly upwards therefrom through a central perforation in said cover of said valve housing, the diameter of said perforation being sufficiently larger than the diameter of said rod to permit radial movement of said rod with respect to the side walls of said perforation, the outer peripheral surface of said rod being joined to said cover in an airtight seal by a flexible annular diaphragm having in transverse cross-section a plurality of wave-like convolutions, the extensibility of said diaphragm permitting radial as well as axial movement of said rod.

54. A device for propelling the distal portion of a flexible sensor cable comprising:
(a) a hollow ring fastened at a longitudinally spaced distance beyond the transverse end plane of said cable, the plane of said ring being perpendicular to the longitudinal axis of the end portion of said cable, and said ring containing a plurality of generally rearward directed jet orifices, and
(b) means communicating with the interior space of said ring for providing pressurized fluid to said interior space.

55. A device for propelling the distal portion of a flexible sensor cable comprising:
(a) a generally cylindrical cap having a central bore adapted to fit coaxially over said distal portion of said cable, said cap having a rearward extending inner coaxial cylindrical flange having an inner diameter larger than the outer diameter of said cable, thereby forming an annular, longitudinally disposed space between the outer circumferential surface of said cable and the inner circumferential surface of said flange, and the front circumferential wall of said flange containing a plurality of circumferentially disposed, radial perforations,
(b) a hollow air supply tube coaxially disposed over said outer circumferential surface of said cable and sealingly joined to the inner circumferential surface of said inner flange,
(c) an outer cylindrical flange section extending backwards a shorter distance than said inner flange section, said outer cylindrical flange forming the outer cylindrical wall of said cap,
(d) a flat, annular-shaped ring fastened coaxially around the outer circumferential wall of said inner flange section, said ring being longitudinally aligned with the rear transverse surface of said outer flange, and sealingly joined thereto, said ring containing a plurlity of circumferentially disposed, generally rearward directed jet holes, and
(e) a source of pressurized fluid sealingly coupled to said supply tube and said cable surface, whereby pressurized fluid may be conducted forward through said annular space between said supply tube and said cable, into said annular space between said inner flange and said tube through said radial perforations in said wall surface of said inner flange section into the annular space between said wall surface and the inner wall surface of said outer flange, said pressurized fluid exiting from said annular space through said jet holes to provide forward thrust to said cap.

56. In a flexible borescope an improvement permitting propelling said borescope through a media, said improvement comprising:
(a) at least one reaction jet fastened to said borescope, and
(b) means for expelling pressurized fluid supplied from a source external to said media from said reaction jet, thereby producing a thrust force on said borescope.

57. The improvement of claim 56 further comprising means for controlling the direction of said thrust force.

* * * * *

REEXAMINATION CERTIFICATE (1380th)
United States Patent [19]
Ginsburgh et al.

[11] B1 4,735,501
[45] Certificate Issued  Nov. 6, 1990

[54] METHOD AND APPARATUS FOR FLUID PROPELLED BORESCOPES

[75] Inventors: Irwin Ginsburgh, Newhall; John A. Carlson, III, Burbank; Geoffrey L. Taylor, Valencia; Hamid Saghatchi, Burbank, all of Calif.

[73] Assignee: Identechs, Inc., Irving, Calif.

Reexamination Request:
No. 90/001,703, Jan. 30, 1989

Reexamination Certificate for:
Patent No.: 4,735,501
Issued: Apr. 5, 1988
Appl. No.: 854,295
Filed: Apr. 21, 1986

[51] Int. Cl.$^5$ .................................. G01N 21/88
[52] U.S. Cl. ........................... 356/241; 350/96.26
[58] Field of Search ................................ 356/241

[56] References Cited

U.S. PATENT DOCUMENTS

| | | |
|---|---|---|
| 2,330,674 | 9/1943 | Briggs . |
| 2,963,543 | 12/1960 | Link et al. . |
| 2,982,191 | 5/1961 | Laval, Jr. . |
| 3,063,663 | 8/1960 | Rickards . |
| 3,075,113 | 1/1963 | Soar . |
| 3,178,883 | 4/1965 | Webb . |
| 3,258,916 | 4/1966 | Lehmann . |
| 3,417,745 | 12/1968 | Sheldon . |
| 3,557,780 | 1/1981 | Sato . |
| 3,565,516 | 2/1971 | Thomas et al. . |
| 3,690,775 | 9/1972 | Cousins . |
| 3,841,764 | 10/1974 | Snell et al. . |
| 4,065,059 | 12/1977 | Jablin . |
| 4,107,738 | 8/1978 | Van Norman . |
| 4,290,421 | 9/1981 | Siegmund . |
| 4,530,568 | 7/1985 | Haduch et al. . |
| 4,536,789 | 8/1985 | Bains . |
| 4,575,185 | 3/1986 | Wentzell et al. . |
| 4,586,079 | 4/1986 | Cooper, Jr. et al. . |
| 4,621,193 | 11/1986 | Van Hoye . |
| 4,621,618 | 11/1986 | Omagari . |

FOREIGN PATENT DOCUMENTS

36092 2/1986 Japan .

OTHER PUBLICATIONS

The New Penguin Dictionary of Electronics, Carol Young, Laurence Urdang Associates, ltd., pp. 470, 471, 540, 541 (1979).
Dictionary of Physics and Mathematics, McGraw-Hill, p. 881 (1978).

*Primary Examiner*—Davis L. Willis

[57] ABSTRACT

A method and apparatus for propelling a borescope being used to inspect inaccessible areas comprises one or more reaction jets attached to the borescope, the reaction jets expelling gas, liquid or other fluids to produce a reaction thrust force on the borescope. In one embodiment, a reaction jet is fastened to the remote head of an articulateable borescope, and the propulsion direction is controlled by an operator who views a desired aim point at the output end of the borescope cable, and articulates the borescope head to point at the desired aim point. In another embodiment, the orientation of the thrust vector of the reaction jets is controllable, permitting an operator to control the direction of travel of a borescope not necessarily possessing an independent articulation capability.

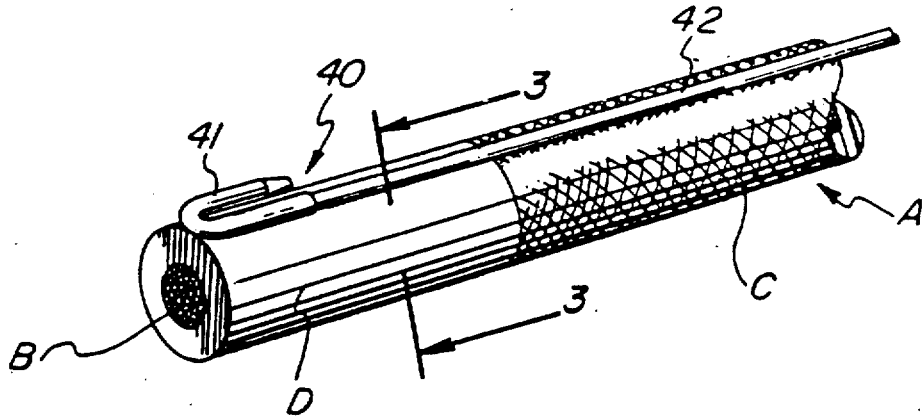

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 35–38 and 46–55 is confirmed.

Claims 1, 10, 15, 22, 24, 29, 39, 40 and 56 are determined to be patentable as amended.

Claims 2–9, 11–14, 16–21, 23, 25–28, 30–34, 41–45 and 57, dependent on an amended claim, are determined to be patentable.

1. A method for propelling [through a media] *an articulated borescope having* a sensor [situated] at the distal end of an elongated conduit adapted to carry signals from said sensor to the proximal end [of said conduit comprising expelling into said media fluid from said] *thereof that includes the steps of remotely steering the* distal end of said conduit [supled from a source external to said media, thereby producing] *to guide said conduit through a serpentine passageway to an inaccessible area, and expelling fluid from said distal end of said conduit, said fluid being supplied from a source external to said remote area to produce* on said conduit a reaction force in a direction opposite to the flow direction of said expelled fluid.

10. A method for propelling and guiding a sensor situated at the distal end of an elongated conduit *that is* adapted to carry signals from said sensor to the proximal end of said conduit comprising:
(a) conducting fluid under pressure from the region near [the] said proximal end of said conduit to said distal end of said conduit,
(b) expelling fluid from said distal end of said conduit, thereby producing a reaction force on said conduit in a direction opposite to the flow direction of said expelled fluid, and
(c) controlling the direction of flow of said expelled fluid *by selectively steering the distal end of said conduit to guide said conduit through a serpentine passageway into an inaccessible area.*

15. A method for remotely propelling and guiding [through a media] a sensor *through a serpentine passageway into an inaccessible area, said sensor being situated* at the distal end of a flexible cable carrying signals from said sensor to the proximal end of said cable comprising expelling from a point near said distal end of said cable fluid supplied from a source external to said [media, thereby producing] *remote area to produce* on said distal end of said cable a reaction force in a direction opposite to the flow direction of said expelled fluid, said force thereby tending to move said distal end of said cable and said sensor, *and selectively steering the distal end of said cable through said serpentine passageway.*

22. The method of claim 19 wherein said flow direction of said expelled fluid is controlled, at least in part, by controlling the spatial orientation of the flow vector of said expelled fluid relative to the spatial orientation of said distal end of said [conduit] *cable.*

24. A device for propelling [through a media] a sensor fastened to the distal end of a conduit *through a serpentine passageway into an inaccessible area, said conduit being* adapted to carry signals from said sensor to the proximal end of said conduit comprising:
(a) a source of pressurized fluid external to said [media, and] *inaccessible area,*
(b) means for expelling said fluid from said distal end of said conduit, thereby producing on said distal end of said conduit a reaction force in a direction opposed to the flow direction of said expelled fluid, and
(c) *control means at the proximal end of said conduit for selectively articulating the distal end of said conduit from the proximal end thereof to steer and guide the conduit through said serpentine passageway into said inaccessible area.*

29. A device for propelling [through a media] in a desired direction the distal end of a flexible cable [having means for controlling the bending of said distal end of said cable from the proximal end of said cable] comprising:
(a) at least one reaction jet fastened to said cable near its distal end, [and]
(b) means for expelling pressurized fluid supplied from a source external to said [media] *distal end* from said reaction jet, thereby producing on said distal end of said cable a reaction force in a direction opposite to the direction of flow of said fluid expelled from said reaction jet, *and*
(c) *control means at the proximal end of said cable for selectively articulating the distal end of said cable from the proximal end thereof to steer and guide the cable through a serpentine passageway into an inaccessible area.*

39. A device for propelling and guiding in a desired direction the distal end of a flexible sensor cable comprising:
(a) a flexible control cable having an articulateable distal end, *with associated means for selectively articulating said distal end,*
(b) means for fastening said distal end of said control cable to the distal end of said sensor cable,
(c) at least one reaction jet fastened to the distal end of said control cable, and
(d) means for providing pressurized fluid to said reaction jet.

40. A device for propelling through a [media] *serpentine passageway into an inaccessible area* a sensor fastened to the distal end of a conduit adapted to carry signals from said sensor to the proximal end of said conduit comprising:
(a) a plurality of reaction jets each haivng a distinct thrust line fastened [to] *directly onto* the distal end of said conduit,
(b) a source of pressurized fluid external to said [media] *inaccessible area;* and
(c) means for selectably conducting said pressurized fluid to a selected one of said reaction jets, thereby permitting control of the orientation of the thrust vector of said jets relative to the distal end of said conduit.

56. In a flexible borescope *of the type in which a sensor is incorporated into a distal tip of an elongated conduit*, an improvement permitting propelling said borescope through a [media,] *serpentine passageway into an inaccessible area* said improvement comprising;
 (a) at least one reaction jet fastened to said borescope, [and]
 (b) means for expelling pressurized fluid supplied from a source external to said [media] *inaccessible area* from said reaction jet, thereby producing a thrust force on said borescope, *and*
 (c) *means for selectively articulating the distal tip of said conduit to guide and steer said conduit through said serpentine passageway.*

* * * * *